(12) United States Patent
McGreevy et al.

(10) Patent No.: US 11,866,981 B2
(45) Date of Patent: Jan. 9, 2024

(54) ACTUATION SYSTEM

(71) Applicant: Thompson Aero Seating Limited, Craigavon (GB)

(72) Inventors: Jonathan McGreevy, Camlough (GB); Thomas Trail, Kilkeel (GB)

(73) Assignee: Thompson Aero Seating Limited, Craigavon (GB)

( * ) Notice: Subject to any disclaimer, the term of this patent is extended or adjusted under 35 U.S.C. 154(b) by 41 days.

(21) Appl. No.: 17/369,231

(22) Filed: Jul. 7, 2021

(65) Prior Publication Data

US 2022/0010607 A1 Jan. 13, 2022

(30) Foreign Application Priority Data

Jul. 10, 2020 (GB) ...................................... 2010706

(51) Int. Cl.
| | | |
|---|---|---|
| *E05F 15/00* | (2015.01) | |
| *E05F 15/643* | (2015.01) | |
| *B64D 11/06* | (2006.01) | |

(52) U.S. Cl.
CPC ........ *E05F 15/643* (2015.01); *B64D 11/0605* (2014.12); *B64D 11/0606* (2014.12); *E05Y 2201/216* (2013.01); *E05Y 2201/654* (2013.01); *E05Y 2201/66* (2013.01); *E05Y 2201/668* (2013.01); *E05Y 2201/672* (2013.01); *E05Y 2900/502* (2013.01); *E05Y 2900/531* (2013.01)

(58) Field of Classification Search
CPC .. E05F 15/643; E05F 15/00; E05Y 2201/216; E05Y 2201/654; E05Y 2201/66; E05Y 2201/668; E05Y 2201/672; E05Y 2900/502; E05Y 2900/531; B64D 11/0615; B64D 11/0606; B64D 11/0605
See application file for complete search history.

(56) References Cited

U.S. PATENT DOCUMENTS

| | | | | |
|---|---|---|---|---|
| 6,115,966 A | * | 9/2000 | Shibata ................. | E05F 15/689 49/374 |
| 2003/0110697 A1 | * | 6/2003 | Perron .................... | E05F 11/36 49/123 |

(Continued)

FOREIGN PATENT DOCUMENTS

| | | |
|---|---|---|
| DE | 102016220686 A1 | 4/2018 |
| EP | 2248958 A2 | 11/2010 |

(Continued)

OTHER PUBLICATIONS

Search Report issued in Application No. GB2010706.6, dated Mar. 23, 2021.

(Continued)

*Primary Examiner* — Chi Q Nguyen
(74) *Attorney, Agent, or Firm* — Burns & Levinson LLP; Joseph P. Quinn; Marlo Schepper Grolnic

(57) ABSTRACT

An actuation system for passenger seating has a first actuating member for actuating a door from an open state to a closed state, and a second actuating assembly for actuating the door from the closed state to the open state. The first actuating member may be a spring configured to allow movement of the door from the closed state to the open state. The second actuating assembly is power-operated. The actuation system allows the door to be opened and closed automatically by the user while still being operable manually.

20 Claims, 4 Drawing Sheets

(56) References Cited

U.S. PATENT DOCUMENTS

| | | | | |
|---|---|---|---|---|
| 2007/0261800 A1* | 11/2007 | Jorgensen | ............ | E05F 15/605 |
| | | | | 160/213 |
| 2008/0127560 A1* | 6/2008 | Harvey | ................ | E05F 15/686 |
| | | | | 49/199 |
| 2010/0242366 A1* | 9/2010 | Liebscher | ............ | E05F 15/643 |
| | | | | 49/142 |
| 2012/0300935 A1* | 11/2012 | Bresson | ................ | E05F 15/684 |
| | | | | 380/274 |
| 2013/0241247 A1* | 9/2013 | Wallace | ............ | B64D 11/0604 |
| | | | | 297/118 |
| 2017/0009507 A1* | 1/2017 | Newman | ............... | E05F 15/686 |
| 2018/0371816 A1* | 12/2018 | Demirtas | ............... | E05F 11/483 |
| 2019/0057133 A1* | 2/2019 | Chainani | ........... | G06F 16/24564 |
| 2020/0130840 A1* | 4/2020 | Frost | ..................... | E05F 15/643 |
| 2020/0339395 A1* | 10/2020 | Kicher | .................... | E05D 13/12 |
| 2021/0131161 A1* | 5/2021 | Contreras | ............... | E05F 15/70 |

FOREIGN PATENT DOCUMENTS

| | | |
|---|---|---|
| EP | 3069996 A1 | 9/2016 |
| EP | 3225548 A1 | 10/2017 |
| GB | 2388177 A | 11/2003 |
| GB | 2576505 A | 2/2020 |

OTHER PUBLICATIONS

Extended Search Report dated Aug. 23, 2021, for related EP Application No. 21183508.7 (8 pgs).

* cited by examiner

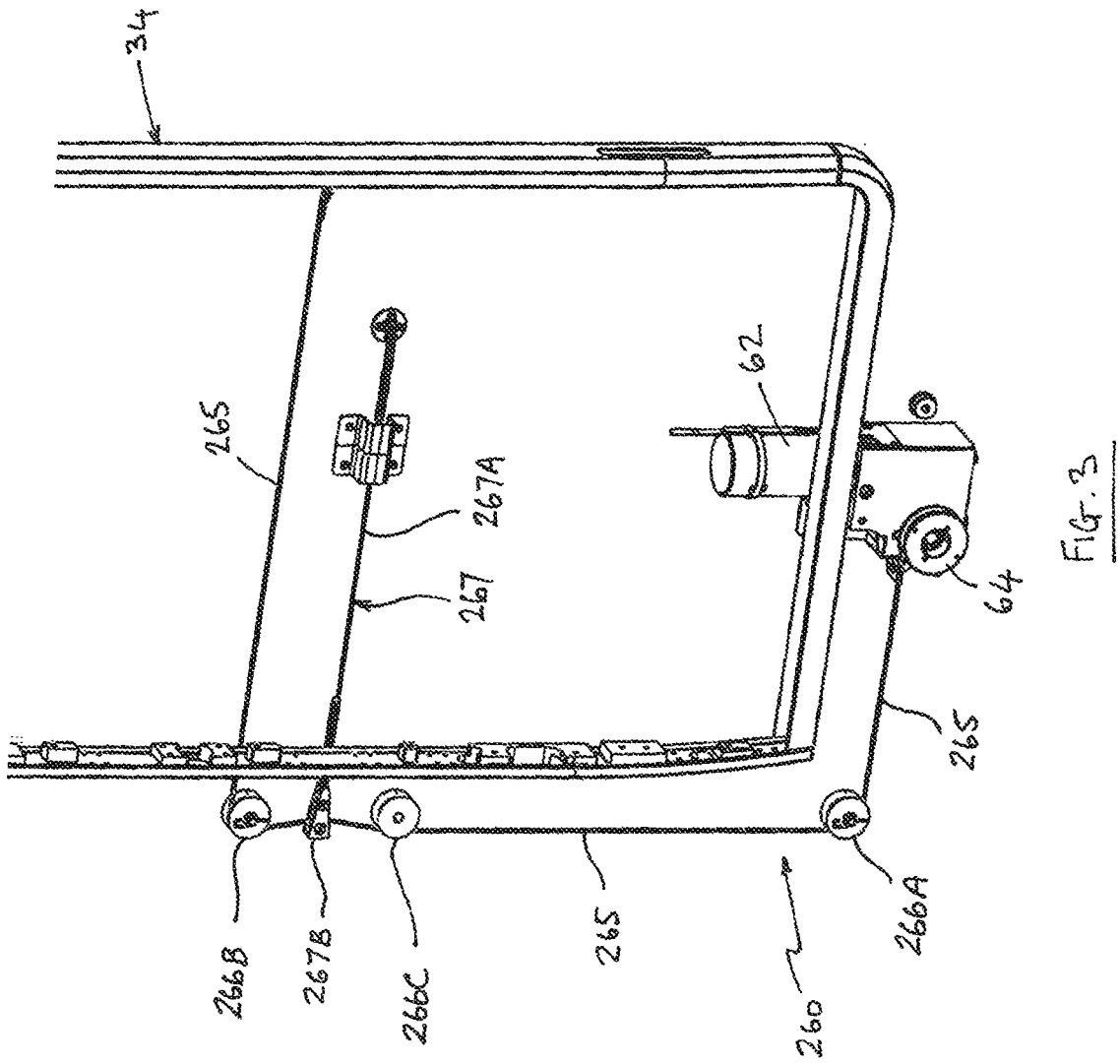

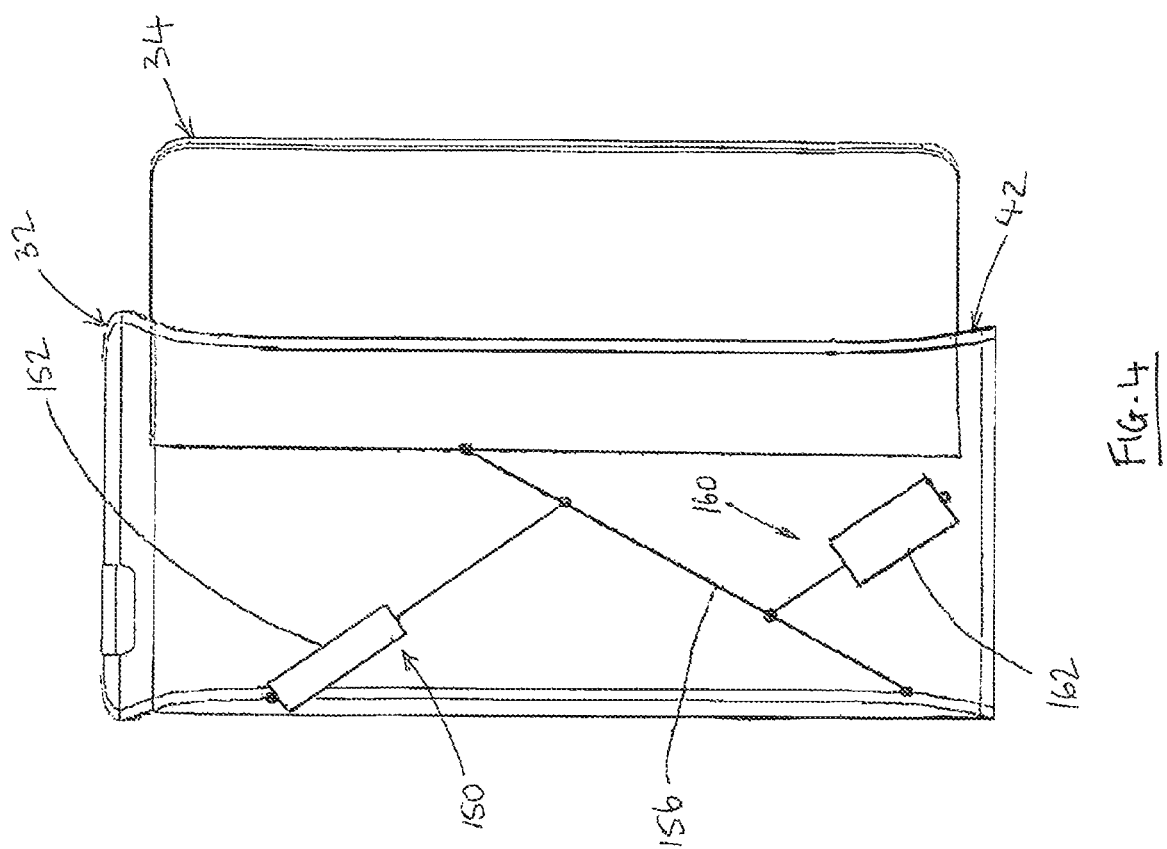

ACTUATION SYSTEM

CROSS REFERENCE TO RELATED APPLICATION

This application is a U.S. patent application which claims priority to United Kingdom Patent Application No. 2010706.6 filed on Jul. 10, 2020, which is incorporated herein by referenced in its entirety.

FIELD OF THE INVENTION

This invention relates to actuation systems. The invention relates particularly to actuation systems for doors and other objects that are part of passenger seating, especially aircraft seating.

BACKGROUND TO THE INVENTION

Power-operated doors are well known. However, in some applications safety concerns place restrictions on how doors can be power-operated. In particular, in many countries aircraft safety regulations require that doors can be opened manually in the event of emergency. Therefore, while it is known to provide powered actuation systems for closing doors of aircraft passenger seating, such doors are conventionally configured to be opened manually. For premium passenger seating it is desirable to provide doors that are power-operated for both opening and closing. However, it is a challenge to implement this functionality while still meeting safety requirements.

It would be desirable to mitigate the problem outlined above.

SUMMARY OF THE INVENTION

From a first aspect the invention provides an actuation system comprising: a base; an object movable with respect to the base between a first state and a second state; first actuating means for actuating said object from said first state to said second state; and second actuating means for actuating said object from said second state to said first state, wherein said first actuating means is configured to allow movement of said object from said second state to said first state, and wherein said second actuating means comprises powered drive means.

Preferably, said powered drive means comprises a motor, preferably a rotary motor.

Typically, said motor is fixed with respect to one of the base or the object and coupled to the other of the base or the object for moving said object from said second state to said first state. The motor is typically a rotary motor having a rotary output, the output being coupled to the other of the base or the object. The rotary output shaft may be coupled to a reel, the reel being coupled to the other of the base or the object.

The reel is typically fixed with respect to said one of the base or the object and carries a reel line that is coupled to the other of the base or the object, preferably via a pulley that is fixed with respect to said one of the base or the object.

Preferably, said drive means is operable to rotate said reel in a first rotational direction when said second actuating means actuates said object from said second state to said first state, wherein, preferably, rotation of said reel in said first rotational direction winds in said reel line.

Preferably, said drive means is operable to rotate said reel in a second rotational direction opposite to said first rotational direction, wherein, preferably, rotation of said reel in said second rotational direction winds out said reel line.

Optionally, the system is configured such that, when said first actuating means actuates said object from said first state to said second state, said second actuating means rotates said reel in said second rotational direction. The system may be configured such that, when said first actuating means actuates said object from said first state to said second state, said second actuating means rotates said reel in said second rotational direction at a speed that maintains tension in said reel line.

Optionally, the system includes at least one tensioning device arranged to maintain tension in the reel line, said at least one tensioning device preferably being coupled between said object and the reel line, and wherein said at least one tensioning device preferably comprises an elasticized tensioning line. Said at least one tensioning device is preferably arranged to take up slack in said reel line caused by movement of said object from said second state to said first state when said powered drive means is not rotating said reel. Preferably, said system is configured to operate said powered drive means to rotate said reel to wind in said reel line by an amount corresponding to an amount of slack in said reel line caused by the movement of said object from said second state to said first state when said powered drive means is not rotating said reel.

In preferred embodiments, said powered drive means of said second actuating means is electrically powered. Said powered drive means preferably comprises an electric motor, preferably an electric rotary motor.

In preferred embodiments, said powered drive means is coupled to one or other of the base or the object by at least one clutch, preferably comprising an autodisconnect clutch, configured to allow manual movement of said object from said second state to said first state.

Preferably, said powered drive means of said second actuating means is coupled to one or other of the base or object by at least one clutch, preferably comprising an autodisconnect clutch, configured to allow movement of said object from said first state to said second state.

Said rotary output shaft may be coupled to the other of the base or object, preferably to said reel, by said at least one clutch.

In preferred embodiments, said first actuating means comprises resilient biasing means arranged to urge said object from said first state to said second state. The resilient biasing means may be coupled between the base and the object. The resilient biasing means typically comprises at least one spring, for example at least one mechanical spring and/or at least one gas spring. Optionally, said at least one spring comprises a constant force spring. Optionally, said at least one spring comprises a spiral spring.

Optionally, said first actuating means comprises a linear actuator, preferably a gas spring linear actuator. Optionally, said second actuating means comprises a linear actuator, preferably an electrically powered linear actuator, coupled between said base and said object.

A linkage may be coupled between the base and the object, said linear actuator being coupled between the base and the linkage to move the object by acting on the linkage. Said first actuating means may be coupled between the base and the linkage. The linkage may be pivotably coupled to the base and to the object.

Preferably, said first actuating means comprises resilient biasing means arranged to urge said object from said first state to said second state, said resilient biasing means preferably being coupled between the base and the object, wherein said resilient biasing means preferably comprises at least one spring, for example at least one mechanical spring and/or at least one gas spring, optionally a linear actuator, preferably a gas spring linear actuator.

Typically, said first state corresponds to an extended or closed position of the object, and said second state corresponds to a retracted or open position of the object. Typically, said second state corresponds to an extended or closed position of the object, and said first state corresponds to a retracted or open position of the object.

Optionally, said object is any one of a door, a divider, a tray, or a monitor. Optionally, said object is movable linearly between said first and second states.

In a preferred embodiment, said object is a door and, preferably, said first state corresponds to an open position of the door, and said second state corresponds to a closed position of the door. Said object may be a door or a divider, and wherein said base is shaped, for example being panel-like or wall-like, to serve as a wall or a divider.

From another aspect the invention provides passenger seating comprising at least one seat and an actuation system embodying the first aspect of the invention. Said object may be part of said at least one seat, or part of a surround structure in which said at least one seat is located, for example a door, a tray, a monitor or a divider. Optionally, said object is a door that is part of a surround structure for at least one seat, and wherein said first state corresponds to an open position of the door, and said second state corresponds to a closed position of the door. Optionally, in the open position, the door exposes a doorway providing passenger access to and from said at least one seat and, in the closed position, the door closes the doorway.

From another aspect the invention provides an aircraft seating installation comprising said passenger seating. The seating installation may comprise a plurality of rows, each row comprising at least one seat, and wherein said doorway is defined between the respective seat surround structure of adjacent rows, or between the seat surround structure of one row and a bulkhead.

Preferred embodiments allow doors and other objects to be opened and closed using actuation means, including powered actuation means, while still being operable manually, e.g. in the event of an emergency. Thus in the case of passenger seating for example, a door can be open or closed automatically thereby giving a premium feel without giving rise to safety concerns.

Further advantageous aspects of the invention will be apparent to those ordinarily skilled in the art upon review of the following description of specific embodiments and with reference to the accompanying drawings.

BRIEF DESCRIPTION OF THE DRAWINGS

Embodiments of the invention are now described by way of example and with reference to the accompanying drawings in which like numerals are used to denote line parts and in which:

FIG. 3 is a perspective view of a preferred embodiment of the actuation system, the actuation system being shown coupled to a door; and FIG. 4 is a schematic side view of a door assembly including an alternative embodiment of the actuation system.

DETAILED DESCRIPTION OF THE DRAWINGS

Figure 1:
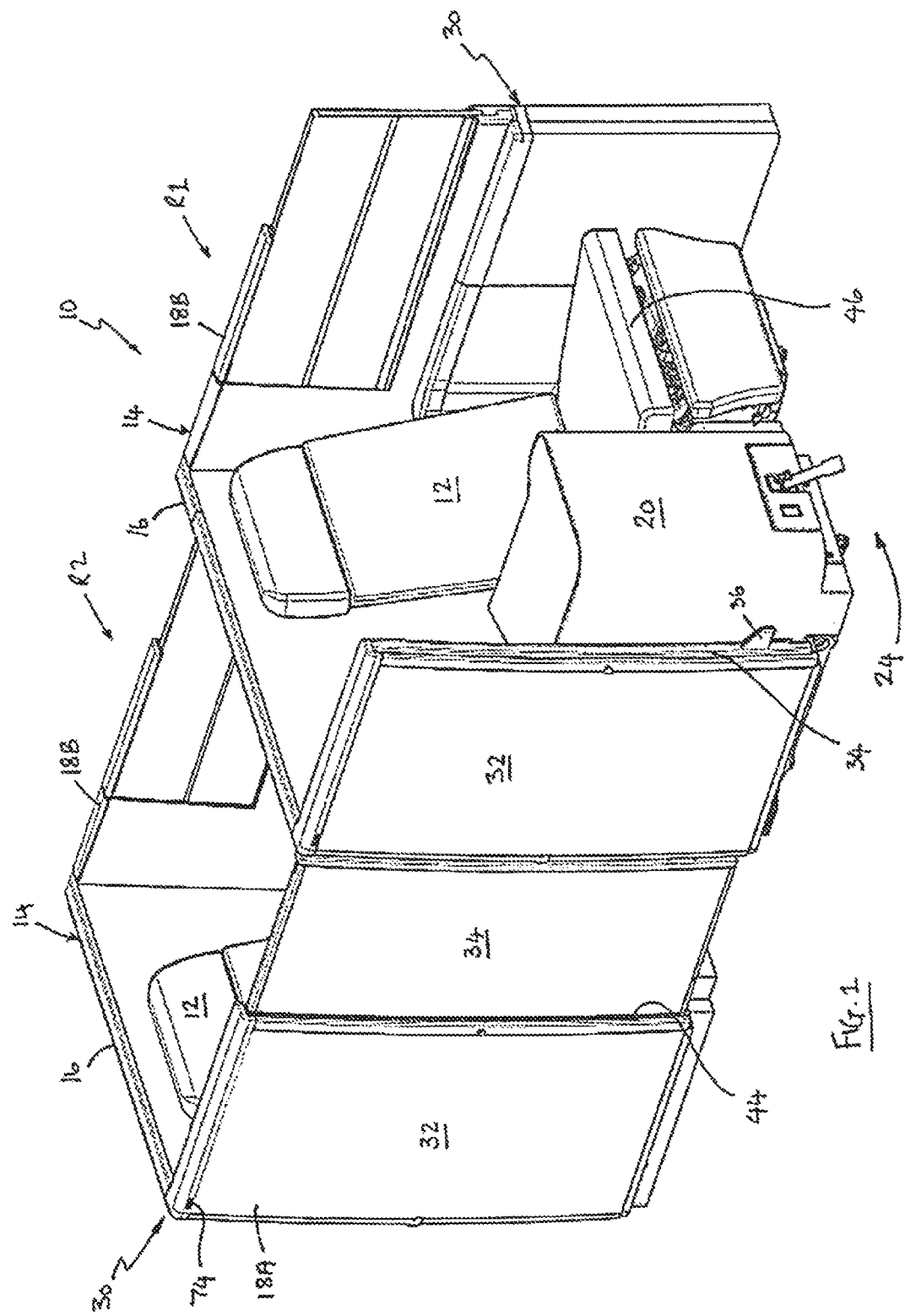
FIG. 1 is a perspective view of passenger seating, in particular aircraft seating, embodying one aspect of the invention and including instances of a door assembly embodying another aspect of the invention.

Referring now to the drawings there is shown, generally indicated as 10, passenger seating embodying one aspect of the invention. Passenger seating embodying the invention is particularly suitable for use in vehicles (e.g. aircraft, boats, trains and buses) where the seating is located in a common passenger area, for example an aircraft cabin, having one or more aisles running alongside the seating. In preferred embodiments, the seating 10 is aircraft seating and is located, in use, in an aircraft cabin (not shown).

In the following description, it is assumed that a seated passenger faces in a forward direction and so terms such as forward, front, rearward, rear and fore-and-aft are intended to be construed accordingly. The term "vertical" is intended to mean perpendicular to the surface on which the seating is located in use.

The seating 10 comprises at least one seat 12, usually a plurality of seats 12 arranged in an array of one or more rows R1, R2, each row having one or more seats 12. In FIG. 1, two rows R1, R2 each with a single respective seat 12 are shown by way of example only. Hence, at the rear of the seating 10 and/or in front of it there may be provided more seating (e.g. additional row(s) of seat(s) 12). Alternatively, when the seating is installed in a cabin, a bulkhead (not shown) may be located in front of and/or behind the seating 10. When the seating 10 is located in a cabin, an aisle is located alongside the seating 10 on one or both sides, typically running substantially perpendicular with the rows R1, R2. The, or each, aisle may separate the seating 10 from additional seating (not shown but which may be the same as the seating 10), bulkhead or cabin wall (not shown).

Each seat 12 is typically located within a shell structure 14 that partially surrounds the seat 12. The shell structure 14 typically includes a back portion 16 behind the seat 12 and at least one side portion 18. At at least one side of the seat 12, the side portion 18 may include a console 20, which may be configured to serve as an armrest and/or may include a deployable table and/or other facilities. The shell structure 14 may be shared by more than one seat 12 of the same row R1, R2, for example being configured to provide the back portion 16 and side portion(s) for each seat 12. For example, in FIG. 1 each row R1, R2 has a respective shell structure 14 configured to provide a respective back portion 16, a respective near side 18A including a side console 20, and a respective far side 18B for the seat 12 in the respective row R1, R2. In alternative embodiments (not illustrated) where the or each row has more than one seat, a screen and/or a console separating adjacent seats in a row may be provided, conveniently as part of a common shell for the row. The seats 12 are typically of a type that can recline to form a bed.

The shell structure 14 provides a seated passenger (not shown) with some privacy from other passengers seated in the same row and in adjacent rows. However, the shell structure 14 must allow space for the passengers to access the seat 12 from the aisle and vice versa. Accordingly, the side portion 18A that is, in use, adjacent an aisle is configured to provide a gap 24 for ingress to and egress from the end seat 12 in the respective row. In typical embodiments, this means that the side portion 18A does not extend fully and permanently to the shell structure 14 of the row in front, or to a bulkhead in front, as applicable. This is in contrast to the far side portion 18B which may extend fully and permanently to the to the shell structure 14 of the row in front, or to a bulkhead in front, as applicable. In this example it is assumed that when the seating 10 is installed, access to the seat 12 is not required from beyond the far side 18B. This might be because, for example, the far side 18B is, when installed, adjacent a cabin wall or a bulkhead, or is adjacent another seat (in the case of a multi-seat row embodiment).

To improve privacy, the side portion 18A comprises a door assembly 30 embodying one aspect of the invention. The door assembly 30 comprises a base portion 32 and a door 34 that is movable with respect to the base portion 32 between an open state and a closed state, the movement typically being linear. In the illustrated embodiment, the base portion 32 extends along the aisle-side of the seat 12 typically from the back 16 of the shell 14, and is typically panel-like in form. The base portion 32, which is typically substantially rectangular in shape, provides a wall on one side (the aisle-side) of the seat 12, typically as part of the shell structure 14. The door 34 is movable with respect to the base 32 between an open state in which the ingress/egress gap 24 is provided, and a closed state in which the gap 24 is closed. It will be understood that the word "closed" in this context does not necessarily mean that the gap 24 is eradicated completely and is therefore intended to embrace "fully closed" and "substantially closed".

In preferred embodiments, the door 34 is a sliding door, i.e. is slidable with respect to the base 32 between the open and closed states. To facilitate sliding movement of the door 34, the door 34 may be coupled to the base 32 by one or more slide mechanism, for example comprising slide rails and/or rollers, which may be provided at the top and/or bottom of the door 34. Optionally, the base 32 comprises a compartment 42 for housing the door 34 when open, the compartment having a mouth 44 through which the door 34 slides into and out of the compartment. The compartment 42 is preferably dimensioned to house substantially the entire door 34 when open. Accordingly, when the door 34 is open, the gap 24 is defined between the leading end of the base 32 and the forward shell structure 14/bulkhead. Alternatively, the arrangement may be such that part of the door projects from the base 32 when open in which case the gap 24 is defined between the leading end of the door 34 and the forward shell structure 14/bulkhead. In alternative embodiments, the arrangement may be such that the door 34 slides alongside the base portion rather than into a compartment in the base; in such cases the base portion may comprise a panel or any other base structure(s)

In any event, the door assembly 30 provides some privacy along the aisle-side of the seat 12 whether or not the door 34 is open since the base 32 extends along side the seat 12, and is typically panel-like in form. However, greater privacy is provided when the door 34 is closed. It is preferred that, when the door 34 is open, the door assembly 30 (i.e. the leading edge of the base 32 or the leading edge of the open door 34 as applicable) extends no further forward than the forward end of the seat pan 46 of the seat 12 to ensure that an adequate gap 24 is provided. It will be apparent that that the height of the door assembly 30 affects the privacy afforded to the passenger. It is preferred that the height of the base 32 and the door 34 is approximately level with the head rest 48 of the seat 12. Preferably, the base 32 and the door 34 are each solid and opaque to maximize privacy. The door 34 is typically substantially rectangular in shape.

By way of example, in FIG. 1, the door 34 of row R1 at the front of the seating 10 is shown in the open state, while the door 34 of row R2 at the back is shown in the closed state. In cases where access is required from one or both ends of a row, e.g. where there is an aisle running alongside the or each end of the row, a respective door assembly is provided for the seat at the or each end of each row, as required. In the case where there is only one seat in the row, a respective door assembly may be provided on each side of the seat, or only on one side, as required. In other embodiments, the door assembly need not be at the side of a seat or a row of seats, but may alternatively be in front of or otherwise adjacent or associated with a seat or row of seats.

Figure 2:
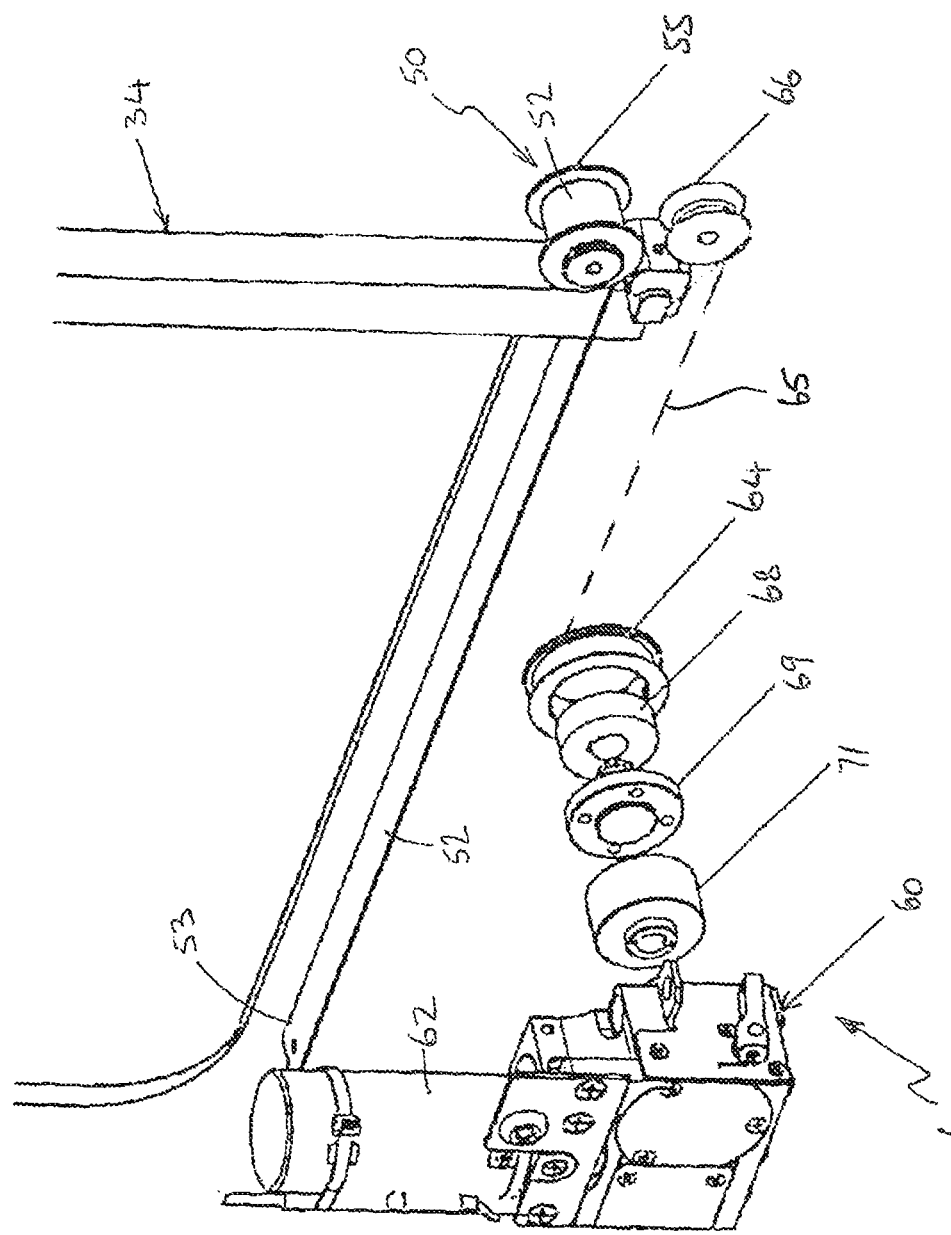
FIG. 2 is a perspective exploded view of an actuation system embodying a further aspect of the invention, the actuation system being suitable for incorporation into the door assembly, and being shown coupled to a door.

With reference to FIG. 2, the door assembly 30 includes actuation means 50 for moving the door 34 from the open state to the closed state. In preferred embodiments, the actuating means 50 comprises resilient biasing means arranged to urge the door 34 from the open state to the closed state. The resilient biasing means is coupled between the base 32 and the door 34. The resilient biasing means may comprise at least one spring, for example at least one mechanical spring and/or at least one gas spring. In preferred embodiments, the or each spring is a constant force spring. In the illustrated embodiment, the resilient biasing means comprises a spiral spring 52. The spring 52 comprises a strip of resilient material (e.g. steel) that adopts a wound state (not shown) when relaxed and may be unwound against the spring-bias. One end 53 of the spring 52 is fixed or otherwise coupled to the base 32 while the other end is coupled to the door 34, typically via a reel 55. The arrangement is such that the spring 52 is unwound (as illustrated in FIG. 2) when the door 34 is open, and so urges the door 34 to close under its spring bias. In the illustrated embodiment, the free end 53 of spring 52 is fixed with respect to the base 32 while the other end, including the reel 55, is coupled to the door 34, although in alternative embodiments the opposite arrangement may be adopted. The door 34 may be returned to the open state by a user manually pushing the door 34 against the bias of the spring 52.

In alternative embodiments, for example as illustrated in the embodiment of FIG. 4, the actuating means 150 may comprise one or more linear actuator 152, for example a gas spring linear actuator, a mechanical spring actuator, coupled between the door 34 and the base 32. The actuator 152 may be biased to adopt its extended state, e.g. by gas, mechanical or other resilient biasing means. In order to provide the desired travel for the door 34, the actuator 152 may be coupled to a linkage 156; extension of the actuator 152 causes the linkage 156 to push the door 34 closed. The illustrated linkage 156 is pivotably connected to the door 34 and may also be pivotably connected to the base 32, although it may alternatively abut against the base 32. The door 34 may be returned to the open state by a user manually pushing the door 34 against the bias of the actuator 152.

More generally, the actuating means 50, 150 is configured to allow movement of the door 34 from the closed state to the open state. To this end, the or each spring 52 and/or actuator 152 may be of a type that allows operation in at least one direction (e.g. retraction and/or extension) by the application of mechanical force by a human user. For example, the or each actuator 52, 152 may be a spring or a spring-biased actuator (e.g. comprising a gas spring or mechanical spring) or a single-acting ram, wherein extension (or retraction) of the actuator is effected by the spring bias, and retraction (or extension) of the actuator may be performed manually against the spring-bias.

The actuation means 50 is part of an actuation system embodying another aspect of the invention. The actuation system includes second actuating means for actuating the door 34 from the closed state to the open state. FIG. 2 illustrates, generally indicated as 60, a preferred embodiment of the second actuating means, shown in exploded view together with the door 34. The second actuating means 60 is power-operated, comprising powered drive means 62, preferably electrically powered drive means. The drive means 62 typically comprises a motor, preferably a rotary motor, optionally a reversible rotary motor. The motor is preferably an electric motor (AC or DC as is convenient). In preferred embodiments, the drive means 62 is provided on the base 32 or is otherwise located such that it has a fixed position with respect to the base 32, and is coupled to the door 34 in order to move the door 34 from its closed state to its open state. Conveniently, the drive means 62 is located within the compartment 42. In preferred embodiments in which the motor is a rotary motor, it has a rotary output that is coupled to the door 34. In preferred embodiments, the coupling translates rotation of the output shaft into linear movement of the door 34. In the illustrated embodiment, the coupling comprises a reel 64, wherein the rotary output shaft is coupled to the reel 64, the reel 64 being coupled to the door 34. The reel 64 is in a fixed location with respect to the base 32 and carries a reel line (shown schematically as 65), e.g. comprising wire of metal or other suitable material, that is fixed or otherwise coupled to the door 34, preferably via a pulley 66 or other suitable line guide(s). The reel 64 may be positioned beneath, or lower than, the door 34. The pulley 66 is in a fixed location with respect to the base 32, conveniently being located at the rear of the door 34 when the door 34 is open and/or level with the line 65 as it comes off the reel 64. The pulley 66 and reel 64 are located relative to each other to allow the door 34 to be fully retracted. Preferably, the reel 64 is located forwardly of the pulley 66 (assuming that the door 34 moves forwardly to close). The arrangement is such that when the door 34 is closed, the reel line 65 is unwound from the reel 64 via the pulley 66. To open the door 34, the drive means 62 is operated to rotate the reel 64 to wind in the reel line 65 via the pulley 66 thereby opening the door 34. In alternative embodiments, the drive means 62 and reel 64 may have a fixed location with respect to the door 34 and the end of the reel line 65 may be fixed or otherwise coupled to the base 32. In alternative embodiments, the reel line may be fixed directly to the door 34 and the pulley 66 may be omitted. In any case, the second actuating means 60 is coupled between the door 34 and base 32 and is operable to open the door. Preferably, one or more tensioning device (not shown), for example comprising a spring, is provided for maintaining tension in the line 65. To this end, the tensioning device(s) may be coupled to or incorporated into the reel 64 and/or the pulley 66.

In preferred embodiments, the powered drive means 62 is coupled to the door 34 by a clutch 68 that is configured to allow manual movement of the door 34 from the closed state to the open state, and/or to allow manual movement of the door 43 from the open state to the closed state and/or to allow movement of the door 43 from the open state to the closed state under the action of the actuating means 50, 150. In preferred embodiments, the clutch 68 is configured to mechanically couple the drive means 62 to the driven object, i.e. the door 34 in preferred embodiments, when the drive means 62 drives the clutch 68, and so to transfer mechanical power to move the door 34, but to decouple the drive means 52 from the door 34 (or other driven object) when an external force is applied to the door 34/driven object, such that the door 34/object can move under the influence of the external force without the movement being transferred to the drive means via the clutch 68. A type of clutch 68 known as an autodisconnect clutch is suitable for use as clutch 68. Preferably, the rotary output of the motor 62 is coupled to the door 34, preferably via the reel 64, by the clutch 68. In alternative embodiments where the drive means 62 is mounted on the door 34, the clutch 68 may couple the motor to the base 32. In the embodiment of FIG. 2, the clutch 68 is shown as part of an assembly that further includes a collar 69 for the clutch 68 and an adaptor 71 for coupling the drive means 62 to the assembly. The assembly and reel 64 are shown in exploded view in FIG. 2, and are assembled together in use as would be apparent to a skilled person. It will be understood that the invention is not limited to the particular configuration of clutch assembly shown in FIG. 2 and other configuration may be used as desired. The operation of the clutch 38 is such that, when the motor 62 is operated (in particular to open the door), the clutch 68 transmits the rotational output of the motor 62 to the reel 64, causing the reel 64 to rotate to wind the reel line 65. However, when an external force is applied to the reel 64, for example when the door 34 is opened manually, or closed manually or by the first actuation means 50, the clutch 68 allows the reel 64 to freewheel, i.e. rotate freely, with respect to the drive means 62.

In preferred embodiments, a user-operable latch (not shown) is provided for holding the door 34 in its open state. The latch may take any conventional form, typically being mechanical or electro-mechanical. A first user control device (not shown) is provided, preferably within reach of a seated passenger, and is linked to the latch to allow the user to operate the latch, in particular to release the door 34. The user control device may take any conventional form, e.g. being mechanical, electro-mechanical or electrical, and may be linked to the latch by any suitable mechanical, electro-mechanical or electrical link (which may be wired or wireless). The preferred arrangement is that the actuating means 50, more particularly the spring 52 and actuator 152 in the illustrated embodiments, is biased to urge the door 34 from the open state to the closed state. Therefore, starting with the door 34 in the open state, when the user operates the latch to release the door 34, the actuating means 50 moves the door 34 to the closed state.

A second user control device (not shown) is provided, preferably within reach of a seated passenger, and is linked to the actuation means 60 for operating the powered drive means 62. The second user control device may take any conventional form, typically comprising a switch or button, and is linked to the drive means 62 by any suitable control link, typically an electrical wired or wireless connection. When the door 34 is in the closed state, the user may operate the powered actuation means 60 to move the door 34 to the open state. In the embodiment of FIG. 2, the reel line 65 is in an extended state when the door 34 is closed (having been unwound from the reel 64 as the door 34 moves towards the open state) and operation of the drive means 62 rotates the reel 64 to retract the reel line 65 by winding it around the reel 64 thereby pulling the door 34 towards and ultimately into the open state. The first and second user control devices may be provided in the same passenger control unit, or in a different passenger control unit, as is convenient.

As indicated above, the actuation means 50 is configured to allow movement of the door 34 from the closed state to the open state against its resilient bias. In the embodiment of FIG. 2, the spring 52 can be unwound or extended against its resilient bias. As such, the actuation means 50 does not prevent movement of the door 34 from the closed state to the open state whether such movement is effected by the drive means 62 or manually by a user. To facilitate this arrangement, the power of the drive means 62 is such that it may overcome the resilient bias of the actuation means 50.

The powered actuation means 60 is configured to allow the door 34 to move from the open state to the closed state so that it does not prevent operation of the actuation means 50. In the embodiment of FIG. 2, this is achieved by the clutch 68. When the door 34 is being closed, the clutch 68 allows the reel 64 to rotate in a direction opposite to the direction in which it rotates when the door 34 is being opened. In the embodiment of FIG. 2, movement of the door 34 toward the closed state pulls the reel line 65 thereby causing as the reel 54 to rotate as the reel line unwinds.

In addition, the powered actuation means 60 is configured so that it does not prevent movement of the door 34 from the closed state to the open state when such movement is effected manually by a user. In the embodiment of FIG. 2, this is facilitated by the tensioning device acting to wind in the line 65 as the door is opened, and/or may be facilitated by the clutch 68. The clutch 68 may be an autodisconnect clutch. Alternatively, the clutch may be configured so that up to an operational limit (which may be above what is experienced during normal operation of the drive means 62 when opening the door 34), the clutch 68 engages to transmit power from the drive means 62 to the door 34 (via the reel 64 in the embodiment of FIG. 2), but that above the limit the clutch 68 disengages to allow the door 34 to move in the direction towards the open state or closed state as applicable. The operational limit relates to any suitable operational parameter, typically torque, force or speed, depending on the type of the clutch. In the FIG. 2 embodiment, the clutch 68 disengages so that the rotation of the reel 64 as the door 34 is manually opened is not imparted to the drive means 62. It will be understood that in alternative embodiments any arrangement of one or more conventional clutches (e.g. freewheel clutch(es), torque limiting clutch(es) and/or overrunning clutch(es) may be provided to give the functionality described herein.

As a result, the door 34 can be opened and closed by the actuation means 50, 60, but can also be opened manually in the event of emergency or should the powered drive means 62 fail.

FIG. 3 illustrates a preferred embodiment of the actuation system, which is similar to the actuation system of FIG. 2 and in which like numerals are used to denote like parts and the same or similar description applies unless otherwise indicated as would be apparent to a skilled person. FIG. 3 shows the actuation system coupled to the door 34, which is only partly shown. The actuation system of FIG. 3 has a first actuating means (not shown) which may be the same or similar to the actuating means 50 of FIG. 2 or the actuating means 150 of FIG. 4. The second actuating means 260 is power-operated, comprising powered drive means 62, preferably electrically powered drive means. The drive means 62 typically comprises a motor, preferably a rotary motor, in particular a reversible rotary motor. In preferred embodiments, the drive means 62 is provided on the base 32 or is otherwise located such that it has a fixed position with respect to the base 32, and is coupled to the door 34 in order to move the door 34 from its closed state to its open state, and preferably also from the open state to the closed state. Conveniently, the drive means 62 is located within the compartment 42. In preferred embodiments in which the motor is a rotary motor, it has a rotary output that is coupled to the door 34. In preferred embodiments, the coupling translates rotation of the output shaft into linear movement of the door 34. In the illustrated embodiment, the coupling comprises reel 64, wherein the rotary output shaft is coupled to the reel 64, the reel 64 being coupled to the door 34. The reel 64 is in a fixed location with respect to the base 32 and carries reel line 265, e.g. comprising wire of metal or other suitable material, which is fixed or otherwise coupled to the door 34, preferably via at least one pulley 266A-266C. The reel 64 may be positioned beneath, or lower than, the door 34. Each pulley 266A-266C is in a fixed location with respect to the base 32. In this embodiment, the line 265 is connected to the door 34 at a located between the bottom and top of the door 34, preferably at or adjacent the forward end of the door 34, or between the forward and rearward ends of the door 34. The pulleys 266A-266C are arranged such that the line 265 is guided between the reel 64 and the connection location on the door 34. Pulley 266A is preferably located at the rear of the door 34 when the door 34 is open, preferably at or below the level of the bottom of the door 34 and/or level with the line 265 as it comes off the reel 64. Pulley 266B is preferably located at the rear of the door 34 when the door 34 is open, preferably above the level of the bottom of the door 34, more preferably level with the location at which the line 265 is connected to the door 34. Pulley 266C is optional but when present is located between pulleys 266A and 266B. In alternative embodiments, any one or more of the pulleys 266A-266C may comprise a line guide or line support and does not need to be a pulley. The pulleys 266A-266C and reel 64 are located relative to each other to allow the door 34 to be fully retracted and extended. Preferably, the reel 64 is located forwardly of the at least the first pulley 266A (assuming that the door 34 moves forwardly to close). The arrangement is such that when the door 34 is closed, the reel line 265 is unwound from the reel 64 via the pulleys 266A-266C. To open the door 34, the drive means 62 is operated to rotate the reel 64 to wind in the reel line 265 via the pulleys 266A-266C thereby opening the door 34. In comparison with the embodiment of FIG. 2, the location at which the reel line 265 is connected to the door 34 is preferred as it facilitates a smoother opening movement.

One or more tensioning device 267 is provided for maintaining tension in the line 265. The tensioning device 267 is coupled between the door 34 and the reel line 265. The tensioning device 267 may comprise an elasticized tensioning line 267A. For example, the tensioning line 267A may comprise one or more spring, or one or more lengths of wire connected to one or more springs, or a line made from elastic material. The tensioning line 267A may be coupled to the door 34 by any convenient fixing device. The tensioning line 267A may be coupled to the reel line 265 by line guide 267B that allows the line 265 to run through it. Preferably, the tensioning line 267A is coupled to the reel line 265 at a location between two line guides, e.g. between pulleys 266B and 266C in the illustrated example. In preferred embodiments, the tensioning line 267A in held under tension at least when the door 34 is out of its open state.

Advantageously, in the embodiment of FIG. 3 the actuating means 260 is operable not only to open the door 34 as described above, but also when the door 34 is being actuated to its closed state. In particular the drive means 62 is operated to rotate the reel 64 in one rotational direction when opening the door 34 (to wind in the reel line 265) and in the opposite rotational direction when the door 34 is being closed (to wind out the reel line 265). The clutch 68 may be omitted. The first actuating means 50, 150 still provides the force for moving the door 34 from the open state to the closed state. Preferably, when the door 34 is being moved to the closed state, the drive means 62 is operated to wind out the reel line 265 at a speed that maintains tension in the reel line 265. It is preferred that, when the door 34 is being moved to the closed state, the drive means 62 is operated to wind out the reel line 265 at a speed that matches or is slower than the speed at which the action of the first actuating means 50, 150 pulls the reel line 265 when moving the door 34. The action of the second actuating means 260 when the door 34 is moved to the closed state helps to control the movement of the door 34, for example by applying a braking force.

Preferably, the user control device that is operable to operate the first actuating means 50, 150 to close the door 34 also operates the second actuating means 260 as described above.

Advantageously, in the event that the door 34 is opened manually any slack in the reel line 265 is taken up by the tensioning device 267, advantageously keeping the reel line 265 under tension. This facilitates keeping the reel line 265 in a state (e.g. kept in contact with the relevant pulleys/guides) that allows the second actuating means 260 to resume its normal operation. If required, after the door 34 has been fully or partly opened manually, the drive means 62 may be operated to wind in the reel line 265 by an amount corresponding to the amount of slack caused by the manual opening. This operation may be performed automatically by a controller (not shown) which may take any suitable conventional form (e.g. a microprocessor or microcontroller based controller). Optionally one or more position sensors (not shown) are provided to determine the position of the door 34, and the controller is configured to wind in the reel line 265 depending on the position of the door 34 indicated by the sensor(s).

In the embodiment of FIG. 4, the second actuating means 160 comprises powered drive means in the form of a linear actuator 162, preferably an electrically powered linear actuator. When power is supplied to the actuator 162, i.e. when it is turned on, it extends (or retracts as applicable). When power is not supplied to the actuator 162, i.e. when it is turned off, it may freely be caused to retract (or extend as applicable) by application of an external force.

The actuator 162 is coupled between the base 32 and the door 34, via linkage 156 in this example. The linkage 156, which may comprise one or more bar or other suitable structure(s), is coupled between the base 32 and the door 34. The linear actuator 162 is coupled between the base 32 and the linkage 156 and is arranged to move the door 34 from the closed state to the open state by acting on the linkage 156. The non-powered, resiliently biased actuator 152 is coupled between the base 32 and the linkage 156 and is arranged to move the door from the open state to the closed state. As such, the actuators 152, 162 may be arranged to move the linkage 156 in opposite directions. The linkage 156 is typically pivotably coupled to the base 32 and to the door 24, and may be located within the compartment 42. The powered actuator 162 may be located in the compartment 42. The resiliently biased actuator 152 may also be located in the compartment 42.

The actuation system of FIG. 4 operates in a manner similar to that of FIGS. 2 and 3 and the same or similar description applies as would be apparent to a skilled person. The door 34 may be held open by a latch (not shown), which may be released by operation of a user control (not shown) to allow the resiliently biased actuator 152 to close the door 34. The movement of the door 34 causes the actuator 162 to retract. The user may operate the powered actuator 162 to open the door 34, i.e. by turning the actuator 162 on to cause it to extend in the illustrated embodiment. The actuator 152 allows the door 34 to open against its resilient bias. The powered actuator 162 is configured to allow the door 34 to be opened manually. As a result, the door 34 can be opened and closed by the actuation means 150, 160, but can also be opened manually in the event of emergency or should the powered actuator 162 fail. Optionally, the powered actuator 165 may be operated to assist closing the door 34.

More generally, the first actuating means 50, 150 preferably comprises resilient biasing means arranged to urge the door 34 from the open state to the closed state, the resilient biasing means typically being coupled between the base 32 and the door 34. The resilient biasing means preferably comprises at least one spring, for example at least one mechanical spring and/or at least one gas spring, and may optionally comprise a linear actuator, preferably a gas spring linear actuator.

In the illustrated embodiments, the actuation system is arranged to actuate a door between its open and closed states. However actuation systems embodying the invention are not limited to use with doors and may alternatively be used to actuate any object between first and second states. For example, in the context of passenger seating, the object may be a divider (e.g. a wall, screen or panel located between adjacent seats), a tray, or a monitor, and may be actuated with respect to any relevant base, which may for example be any convenient part of the passenger seating, e.g. a console or part of the surrounding structure. The base may for example be shaped, e.g. being panel-like or wall-like, to serve as part of a wall or a divider. Typically, the arrangement is such that the object moves linearly with respect to the base, although it may move in other ways, e.g. pivoting movement.

The invention is not limited to the embodiment(s) described herein but can be amended or modified without departing from the scope of the present invention.

The invention claimed is:

1. An actuation system comprising:
   a base;
   an object movable with respect to the base between a first state and a second state;
   first actuating means for actuating said object from said first state to said second state, said first actuating means comprising resilient biasing means arranged to urge said object from said first state to said second state; and
   second actuating means for actuating said object from said second state to said first state,
   wherein said first actuating means is configured to allow movement of said object from said second state to said first state, and
   wherein said second actuating means comprises powered drive means comprising a rotary motor having a rotary output coupled to a reel, the reel carrying a reel line that can be wound onto and wound off of said reel.

2. The system of claim 1, wherein said rotary motor is fixed with respect to the object or to the base.

3. The system of claim 1, wherein said reel is fixed with respect to the object or to the base via either or both of:
   one or more pulley; and
   one or more line guide that is fixed with respect to said other of the base or the object.

4. The system of claim 3, further including at least one tensioning device arranged to maintain tension in the reel line.

5. The system of claim 4, wherein said at least one tensioning device comprises an elasticized tensioning line coupled between said object and the reel line.

6. The system of claim 1, wherein said powered drive means is operable to rotate said reel in a first rotational direction to actuate said object from said second state to said first state, and wherein rotation of said reel in said first rotational direction winds said reel line onto said reel.

7. The system of claim 6, wherein said powered drive means is operable to rotate said reel in a second rotational direction opposite to said first rotational direction, and wherein rotation of said reel in said second rotational direction unwinds said reel line from said reel.

8. The system of claim 7, wherein the system is configured such that, in response to said first actuating means actuating said object from said first state to said second state, said second actuating means rotates said reel in said second rotational direction.

9. The system of claim 8, wherein the system is configured such that, in response to said first actuating means actuating said object from said first state to said second state, said second actuating means rotates said reel in said second rotational direction at a speed that maintains tension in said reel line.

10. The system of claim 1, wherein said powered drive means of said second actuating means is electrically powered.

11. The system of claim 1, wherein said powered drive means is coupled to said one of the base or the object by at least one clutch that is configured to allow manual movement of said object from said second state to said first state.

12. The system of claim 1, wherein said powered drive means of said second actuating means is coupled to said one of the base or object by at least one clutch that is configured to allow movement of said object from said first state to said second state.

13. The system of claim 1, wherein said resilient biasing means is coupled between the base and the object and is selected from the group of: at least one spring, at least one mechanical spring, at least one gas spring, a linear actuator, a gas spring linear actuator, at least one spiral spring, at least one constant force spring, and at least one constant force spiral spring.

14. The system of claim 1, wherein said object is any one of a door, a divider, a tray, or a monitor.

15. The system of claim 1, wherein said object is movable linearly between said first and second states.

16. Passenger seating comprising:
at least one seat,
a surround structure for said at least one seat, and
an actuation system, the actuation system comprising:
  a base;
  a door, said door being part of said surround structure and being movable with respect to the base between a first state corresponding to an open position of the door, and a second state corresponding to a closed position of the door;
  first actuating means for actuating said door from said first state to said second state, said first actuating means comprising resilient biasing means arranged to urge said door from said first state to said second state; and
  second actuating means for actuating said door from said second state to said first state,
  wherein said first actuating means is configured to allow movement of said door from said second state to said first state, and
  wherein said second actuating means comprises powered drive means comprising a rotary motor having a rotary output coupled to a reel, the reel carrying a reel line that can be wound onto and wound off of said reel.

17. The system of claim 16, wherein said door is movable linearly between said first and second states.

18. The system of claim 16, wherein said resilient biasing means is coupled between the base and the door and is selected from the group of: at least one spring; at least one mechanical spring; at least one gas spring; a linear actuator; a gas spring linear actuator; at least one spiral spring; at least one constant force spring; and at least one constant force spiral spring.

19. An actuation system comprising:
a base;
an object movable with respect to the base between a first state and a second state;
first actuating means for actuating said object from said first state to said second state, said first actuating means comprising resilient biasing means arranged to urge said object from said first state to said second state; and
second actuating means for actuating said object from said second state to said first state,
wherein said first actuating means is configured to allow movement of said object from said second state to said first state,
wherein said second actuating means comprises a powered linear actuator coupled between said base and said object,
wherein a linkage is coupled between the base and the object, said linear actuator being coupled between the base and the linkage in order to move the object by acting on the linkage, and
wherein said resilient biasing means is coupled between the base and the linkage in order to move the object by acting on the linkage.

20. The actuation system of claim 19, wherein said object is a door that is part of a surround structure for at least one seat.

* * * * *